March 22, 1932. M. HOLMDAHL 1,850,990
SIGNAL
Filed Nov. 8, 1926
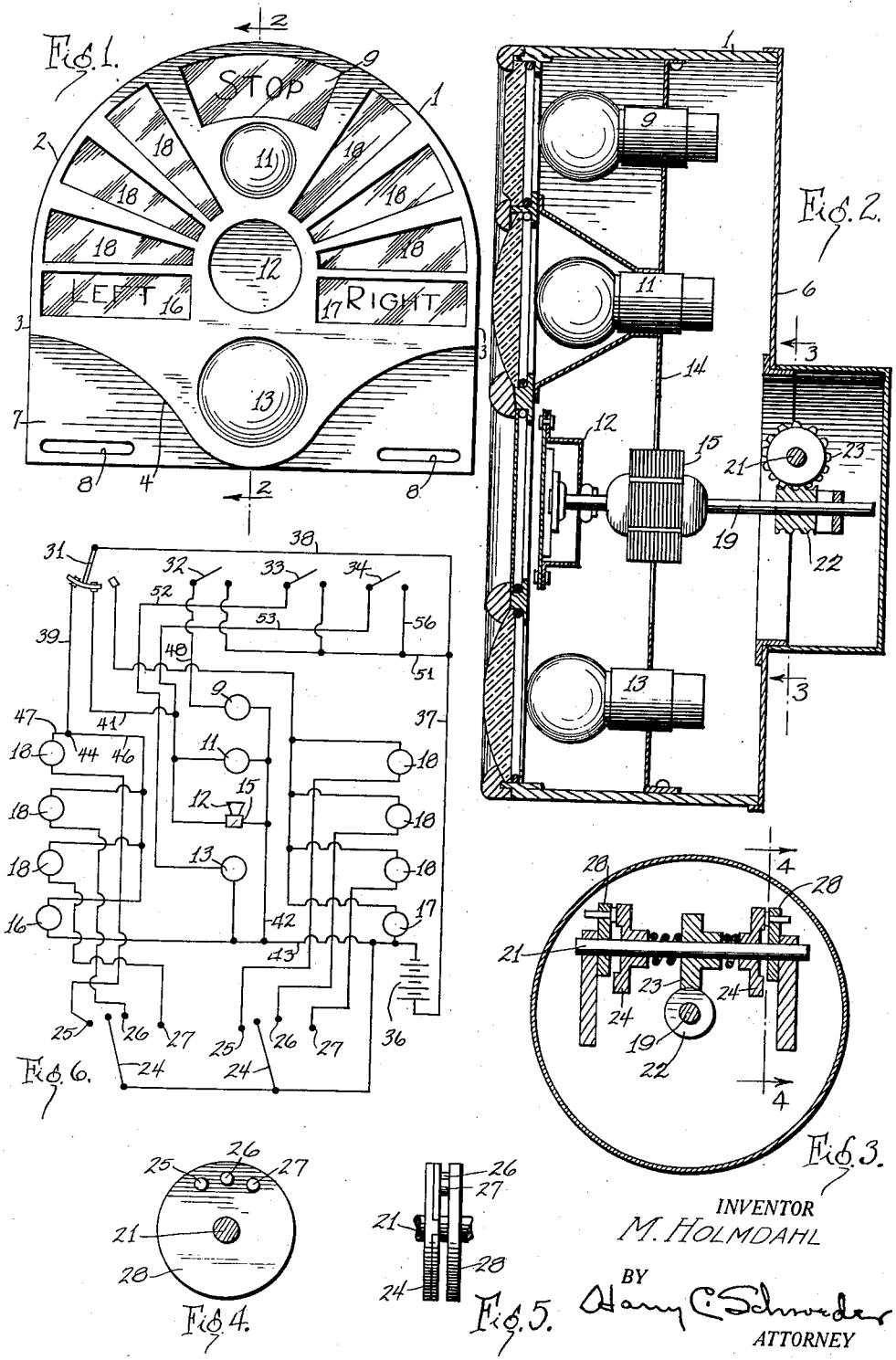
INVENTOR
M. HOLMDAHL
BY Harry C. Schroeder
ATTORNEY Patented Mar. 22, 1932

1,850,990

UNITED STATES PATENT OFFICE

MONVILLE HOLMDAHL, OF OAKLAND, CALIFORNIA

SIGNAL

Application filed November 8, 1926. Serial No. 146,892.

The present invention relates to improvements in signalling devices for motor vehicles and one of the objects of the invention is to arrange a number of different signals in a single unit which answers all the requirements of a complete signalling system and which may be attractively arranged in a single casing. It is particularly proposed to arrange into this single unit, which faces rearwardly so as to be visible to the driver of a vehicle following the one equipped with my device, a stop signal, a rear light, an audible alarm such as a horn, a tail light, lights indicating left and right turns, and a plurality of intermittently and successively active lights arranged relative to the left and right signals for drawing attention thereto. It is furthermore proposed to provide control means for the various signals which are adapted to render the same particularly effective. The stop signal will be rendered active by the application of the brakes, the rear head light and the horn either by a separate switch on the dash or by a switch cooperating with the reverse gear shift, the left and right signals either by separate switches or by switches associated with the steering post, provision being made that when the left and right signals are used, the horn and the intermittent signals are rendered active at the same time. It is further proposed to provide means allowing a single motor to operate both the horn and the intermittently active lights. Further objects and advantages of my invention will appear as the specification proceeds.

The preferred form of my invention is illustrated in the accompanying drawings in which—

Figure 1 shows a rear view of my device,

Figure 2 a vertical section, somewhat enlarged, taken along line 2—2 of Figure 1, Figure 3 a sectional detail view taken along line 3—3 of Figure 2, Figure 4 a sectional detail view taken along line 4—4 of Figure 3, Figure 5 a side elevation of a rotary switch mechanism, used in my device, and Figure 6 a wiring diagram.

While I have shown only the preferred form of the invention, I wish to have it understood that various changes or modifications may be made within the scope of the claims hereto attached without departing from the spirit of the invention.

As illustrated in the drawings, the various features of my invention are accommodated in a single housing 1, the outlines of which, when viewed from the rear, describe a semicircle 2 in the upper section, with side walls 3 extending downwardly from that section in vertical direction and joining the bottom piece 4 which is curved in the manner indicated in Figure 1 to provide additional space along the vertical center line. The rear wall 6 is continued beyond the bottom 4 as shown at 7 and provided with slots 8 which may be used for fastening a license plate to the said extension. In this housing are arranged, along the vertical center plane thereof, four different signals, namely—the stop light 9, the rear head light 11, the horn 12, and the tail light 13. All of these are supported in a central wall 14, and the housing is suitably subdivided in a manner not shown in detail in the drawings by partitions furnishing individual chambers for the different signals. There are furthermore provided just below the semi-circular top section of the housing two horizontal chambers 16 and 17 respectively, while a plurality of other chambers 18 are arranged radially to fill the space between the chambers 16 and 17 and the vertical plane. The chambers present transparent faces rearwardly and are suitably marked as indicated in Figure 1. The chambers marked "Left" and "Right" are preferably provided with colored glass, the left one being red and the right one being green, and the radial chambers 18 presenting the same colors as the adjacent left and right chambers 16 and 17.

The horn 12 which is disposed centrally of the entire device is run by the motor 15, and the motor shaft 19, the front end of which operates the horn, extends rearwardly to operate a switching mechanism causing the lights in the chambers 18 to light up intermittently and successively whenever the lights in the chambers marked "Left" and "Right" are lit. The object of the intermittent lighting of the chambers 18 is to draw attention to the left and right signals.

The switch mechanism referred to is operated by a transverse shaft 21 driven by the shaft 19 thru the worm gear 22 and the worm 23 and provided with two discs 24 on opposite sides of the vertical center line which latter discs are formed with alternate conducting and non-conducting sections which successively brush over three contacts 25, 26 and 27 stationarily supported on the member 28.

For the electrical connections, reference is had to the wiring diagram of Figure 6. A plurality of different circuits are shown in this diagram and are controlled by four different switches diagrammatically indicated at 31, 32, 33, and 34.

The switch 31 controls the left and right lights with their respective intermittent lights drawing attention to the same, and the horn so that when the driver intends to make a left hand turn, the left light will be lit continuously while the three lights 18 superimposed thereon will light intermittently and successively to draw attention to the left light and the horn is rendered active at the same time. This circuit may be traced as follows: With the switch closed as shown in the diagram, a current will flow from the battery 36 thru the wires 37 and 38 and the handle of the switch 31 into the two wires 39 and 41. The wire 41 leads to the motor 15 of the horn and from there thru the wires 42 and 43 back to the battery. The branch beginning with the wire 39 branches again at 44, one branch 46 passing thru the light 16 to the battery 36 while the other branch 47 passes thru the three lights 18 and the switches 25, 26, or 27, whichever happens to be closed. It will be seen that in this manner, when the switch 31 is closed on the left hand side, the light in the left chamber 16 and the horn will both become active, while at the same time, the lights in the chambers 18 on the left side are rendered active intermittently and successively, so as to draw attention to the fact that the left chamber indicating an intended left hand turn is lit.

A turning of the switch 31 over to the right will have a similar effect on the right hand side of the signalling device, lighting the light in the chamber 17, blowing the horn, and intermittently and successively lighting the lights in the chambers 18 on the right side.

The closing of the switch 32 causes a current to flow thru the wire 38, the stop light 9, the wire 42, the wire 43, the battery 36, and the wires 37 and 51.

The closing of the switch 33 causes a current to flow thru the wire 52, the tail light 13, the wire 43, the battery 36, and the wires 37 and 51.

When the switch 34 is closed, a current flows thru the wire 53, the rear head light 11 and the windings of the motor 15 for the horn, the wires 42 and 43, the battery 36, the wire 37, and the wire 56. It will be seen that when the driver backs up, not only is the street flooded with light back of the car, but the horn is sounded at the same time.

It will be understood that a buzzer may be substituted in the place of the horn and that sockets timed by means of a heat resisting metal may be substituted for the flashing device. A universal motor may be used for the horn while obtaining the same results with the lights and a magnetic coil may be substituted for the motor. The preferred construction only is shown in the drawings but the above changes are to be considered as lying within the spirit of the invention.

I claim:

A turn indicating signal comprising a casing, a turn indicating symbol carried thereby, means for illuminating said symbol to give a turn indication, a supplementary indicating means associated with said symbol, and means for continuously causing a shifting illumination of said supplementary means in a constant direction of shift toward said turn indicating symbol during the illumination of said symbol.

In testimony whereof I affix my signature.

MONVILLE HOLMDAHL.